(12) United States Patent
Ho (10) Patent No.: US 9,958,906 B2
(45) Date of Patent: May 1, 2018

(54) LEAF SPRING COMPUTER DEVICE STAND

(71) Applicant: HEWLETT-PACKARD DEVELOPMENT COMPANY, L.P., Houston, TX (US)

(72) Inventor: Chi-Chung Ho, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/305,291

(22) PCT Filed: Apr. 30, 2014

(86) PCT No.: PCT/US2014/036117
§ 371 (c)(1),
(2) Date: Oct. 19, 2016

(87) PCT Pub. No.: WO2015/167516
PCT Pub. Date: Nov. 5, 2015

(65) Prior Publication Data
US 2017/0045911 A1     Feb. 16, 2017

(51) Int. Cl.
*G06F 1/18* (2006.01)
*G06F 1/16* (2006.01)
*F16M 11/20* (2006.01)
*F16M 13/00* (2006.01)

(52) U.S. Cl.
CPC ......... *G06F 1/166* (2013.01); *F16M 11/2021* (2013.01); *F16M 13/005* (2013.01); *G06F 1/1626* (2013.01)

(58) Field of Classification Search
USPC .................................................. 361/679.59
See application file for complete search history.

(56) References Cited

U.S. PATENT DOCUMENTS

| | | | | |
|---|---|---|---|---|
| 4,669,694 A * | 6/1987 | Malick | ................... | F16M 11/10 248/130 |
| 5,732,928 A * | 3/1998 | Chang | ................... | G06F 3/0208 248/456 |
| 7,299,580 B2 * | 11/2007 | Wang | ..................... | F16M 11/10 248/461 |
| 7,950,617 B2 * | 5/2011 | Zhu | ...................... | F16M 13/005 248/454 |
| 8,267,368 B2 * | 9/2012 | Torii | ...................... | F16M 11/10 248/188.8 |
| 8,360,382 B2 * | 1/2013 | Wu | ........................ | F16M 11/10 248/165 |
| 8,382,059 B2 | 2/2013 | Le Gette et al. | | |

(Continued)

FOREIGN PATENT DOCUMENTS

| KR | 10-2008-0075334 | 8/2008 |
|---|---|---|
| WO | WO-2013116842 | 8/2013 |

OTHER PUBLICATIONS

Ogier, H; "Microsoft Surface Pro 2 Windows tablet"; PCT Word New Zealand; May 11, 2013; 13 pages.

*Primary Examiner* — Mukund G Patel
(74) *Attorney, Agent, or Firm* — HP Inc Patent Department (57) ABSTRACT

A support stand leg is pivotally supported by a leaf spring relative to a back cover of a computer device or a computer device case. The support stand leg is pivotal between a retracted position against the back cover and an extended position. The leaf spring urges the support stand leg towards the retracted position.

10 Claims, 5 Drawing Sheets

(56) References Cited

U.S. PATENT DOCUMENTS

| | | | |
|---|---|---|---|
| 8,985,543 B2 * | 3/2015 | Chen | A45C 11/00 |
| | | | 206/45.24 |
| 9,185,954 B2 * | 11/2015 | Cheung | F16M 11/10 |
| 2011/0285258 A1 * | 11/2011 | Yuan | G06F 1/1626 |
| | | | 312/223.2 |
| 2012/0006950 A1 | 1/2012 | Vandiver | |
| 2012/0140410 A1 | 6/2012 | Chen et al. | |
| 2012/0170190 A1 | 7/2012 | Chen et al. | |
| 2012/0326003 A1 | 12/2012 | Solow et al. | |
| 2013/0009024 A1 | 1/2013 | Liu | |
| 2013/0176681 A1 * | 7/2013 | Lee | G06F 1/1626 |
| | | | 361/679.55 |
| 2013/0186682 A1 | 7/2013 | Gallagher et al. | |
| 2013/0229773 A1 | 9/2013 | Siddiqui et al. | |
| 2014/0034521 A1 | 2/2014 | Liu | |
| 2014/0332418 A1 * | 11/2014 | Cheung | F16M 11/10 |
| | | | 206/45.2 |

* cited by examiner

LEAF SPRING COMPUTER DEVICE STAND

BACKGROUND

Many computing devices include displays or touchscreens. In some circumstances, it is desirable to support the display or touchscreen in an inclined orientation for viewing. Existing computer device stands undesirably increase the thickness of the computer device and/or its case.

DETAILED DESCRIPTION OF THE EXAMPLE EMBODIMENTS

Figure 1:
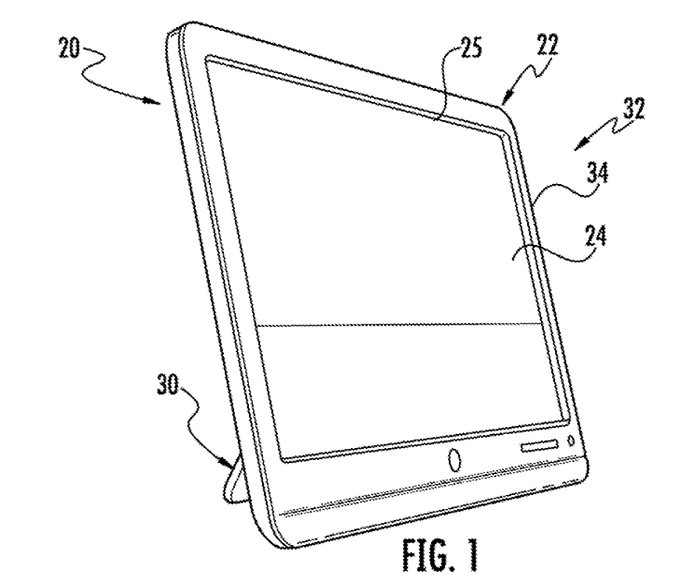
FIG. 1 is a front perspective view of an example computer device with an example support mechanism in an extended position.
Figure 2:
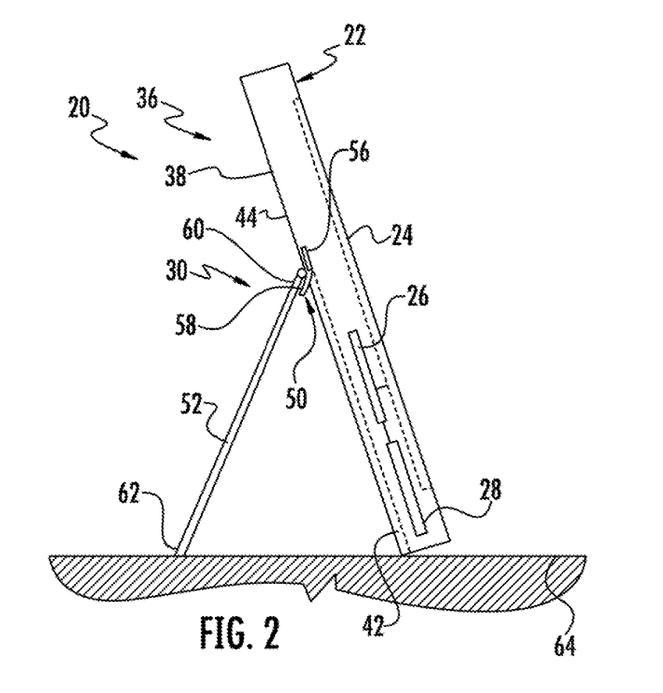
FIG. 2 is a side view of the computer device of FIG. 1 with portions schematically illustrated.
Figure 3:
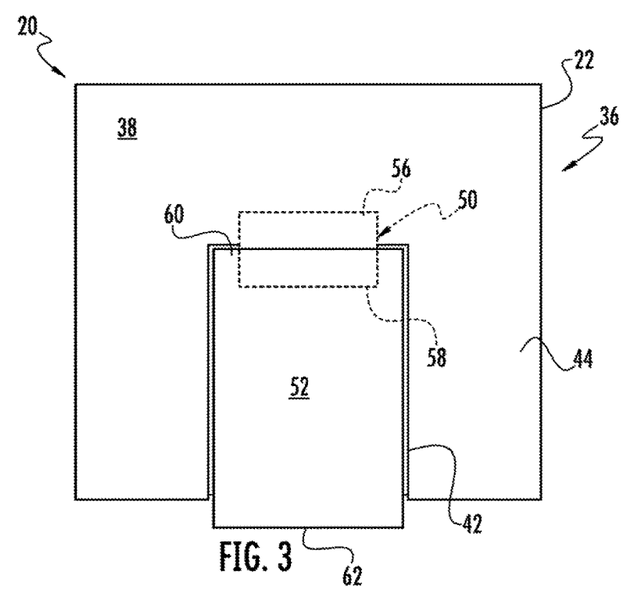
FIG. 3 is a rear view of the computer device of FIG. 1.
Figure 4:
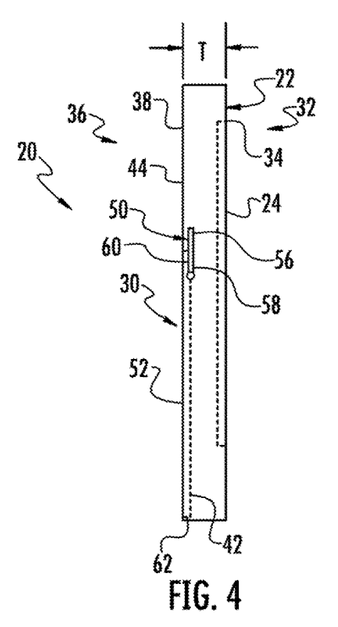
FIG. 4 is a side view of the computer device of FIG. 1 illustrating an example support mechanism in a retracted position.

FIGS. 1-4 illustrate an example computer device 20. FIGS. 1-3 illustrate computer device 20 in an inclined state while FIG. 4 illustrates computer device 20 in a collapsed state for laying flat on a support surface or for being stored/transported. As will be described hereafter, computer device 20 incorporates a stand that is embedded within computer device 20 in which assists in maintaining the thin profile or thickness of computer device 20.

As shown by FIGS. 1-3, computer device 20 comprises housing 22, display screen 24, processor 26 (schematically shown in FIG. 2), memory 28 (schematically shown in FIG. 2) and support mechanism 30. Housing 22 comprises a body enclosing the internal electronics of computer device 20. In one implementation, housing 22 supports one or more pushbuttons or slide bars by which computer device 20 may be turned on an off or by which other input may be made. In one implementation, housing 22 supports one or more ports by which cables, microphones, speakers and the like may be connected to computer device 20. In the example illustrated, housing 22 comprises a front side 32 comprising a frame portion 34 which frames display panel 24 and a backside 36 which includes a hack panel or back cover 38. Back cover 38 supports support mechanism 30. In the example illustrated, back cover 38 comprises a recess or cavity 42 which receives support mechanism 30 such that the components of support mechanism 30 are either flush with an outer back surface 44 of back cover 38 or completely recessed within cavity 42. In yet other implementations, cavity 42 may be omitted, wherein support mechanism 30 extends parallel to and along the back or rear side 36 of that cover 38.

In one implementation, back cover 38 is formed from a metal, such as a stainless steel or aluminum material. In yet another implementation, back cover 38 is formed from a substantially inflexible or rigid polymer. In yet other implementations, back cover 38 is formed from other materials or has other configurations. In one implementation, computer device 120 comprises a tablet computer. In other implementations, computer device 120 may comprise other types of computing devices.

Display screen 24 comprises a display by which graphics, text, photos and videos are displayed. In one implementation, display screen 24 comprises a touch screen by which display screen 24 itself serves as an input device for computer device 20. In other implementations, display screen 24 may not be a touch screen or may have other sizes are shapes.

Processor 28 comprises one or more processing units configured to perform computing operations in accordance with instructions provided by memory 28. Memory 28 comprises a non-transitory computer-readable medium containing computer readable code or programming for directing processor 26 to execute one or more programs and to present images and data on display screen 24. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processor 26 may be embodied as part of one or more application-specific integrated circuits (ASICs). Unless otherwise specifically noted, the controller is not limited to any specific combination of hardware circuitry and software, nor to any particular source for the instructions executed by the processing unit.

Support mechanism 30 comprises a mechanism to selectively maintain computer device 20 in the upright or inclined orientation shown in FIGS. 1-3. In the example illustrated, support mechanism 30 is incorporated as part of computer device 20, and in particular, back cover 38. In the example illustrated support mechanism 30 can be at least partially recessed into back cover 38. In the example illustrated, support mechanism 30 comprises leaf spring 50 and support stand leg 52.

Leaf spring 50, sometimes referred to as a cart spring, elliptical spring or carriage spring, comprises a slender arc-shaped length of spring steel or other resilient material in a substantially planar or plate-like shape. Leaf spring 50 has a first end portion 56 coupled to back cover 38 and a second end portion 58 coupled to leg 52. In the example illustrated, end portion 56 of leaf spring 50 is embedded or recessed within computer device 20 between surface 44 of back cover 38 and display panel 24. End portion 58 of leaf spring 50 projects from an inner enclosed portion of housing 22 into the cavity 48 where end portion 58 is secured to a mounting end 60 of leg 52. Leaf spring 50 pivotally connects leg 52 to back cover 38 for movement between a retracted position against back cover 38 as shown in FIG. 4 and an extended position shown in FIG. 2. In addition, leaf spring 50 resiliently urges leg 52 towards the retracted position shown in FIG. 4.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Support stand leg 52 comprises an elongate substantially rigid member pivotally supported by leaf spring 50 and extending rearwardly from rear side 36 of back cover 38 when in the extended position shown in FIGS. 1-3. Support stand leg 52 extends from mounting end 60 to a terminal support end 62. In one implementation, terminal end 62 may be coated with a rubber or other layer of material for enhanced gripping or frictional interaction with support surface 64. As will be described hereafter, in one implementation, terminal end 62 may be provided with a foot to further resist against slipping or sliding movement of terminal end 62 along support surface 64 when leg 52 is in an extended position.

As shown by FIG. 4, leaf spring 50 resiliently urges support stand leg 52 from the extended position shown in FIG. 2 towards the retracted position shown in FIG. 4. In the retracted position, leg 52 is recessed within cavity 42 such that the backside of leg 52 is either flush with the surface 44 or is recessed within cavity 42 below surface 44. As a result, when computer device 20 is simply lifted from support surface 64, leaf spring 50 automatically returns leg 52 to the retracted state shown FIG. 4, permitting computer device 22 be laid flat on support surface 64 with surface 14 parallel to surface 64 and with display screen 24 facing in an upward direction. Likewise, when computer device 20 is simply lifted from support surface 64, spring 50 automatically returns leg 52 to the retracted state shown in FIG. 4, permitting computer device 22 to be stored or transported while leg 52 is recessed so as to protect leg 52 from bending or other damage when leg 52 is not being used.

Because spring 50 comprises a leaf spring, spring 50 has a relatively thin profile. As a result, leaf spring 50 does not substantially increase the thickness T of computer device 20. At the same time, leaf spring 50 reduces or eliminates the use of complex and space consuming hinges which may increase the thickness of computer device 20. In the example illustrated, the sole connection and support of leg 52 is provided by leaf spring 50. In other implementations, additional structures may be provided for pivotally supporting and 60 of leg 52 to back cover 38 and/or for resiliently urging leg 52 towards the retracted position shown in FIG. 4.

Figure 5:
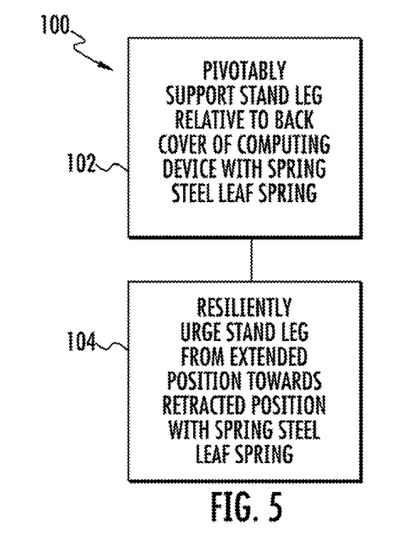
FIG. 5 is a flow diagram of an example method that may be carried out using the computer device of FIGS. 1-4.

FIG. 5 is a flow diagram of an example method 100 that may be carried through the use of computer device 20 shown in FIGS. 1-4. As indicated by block 102, computer device 20 pivotably supports stand leg 52 relative to back cover 38 with leaf spring 50. As indicated by block 104, computer device 20 resiliently urges support stand leg 52 from the extended position shown in FIGS. 1-3 towards the retracted position shown in FIG. 4 with leaf spring 50. Because the same component serves both functions of (1) pivotally supporting leg 52 relative to back cover 38 and (2) resiliently urging leg 52 towards the retracted position, fewer components are utilized and the thickness of computer device 20 is reduced.

FIGS. 6-9 illustrate computer device 120, an example implementation of computer device 20. Computer device 120 is similar to computer device 20 except that computer device 120 comprises support mechanism 130 in lieu of support mechanism 30. Support mechanism 130 is similar to support mechanism 30 except that support mechanism 130 additionally comprises a hinge foot 170, angle retaining linkage 172 and linkage retainer 174. Those remaining elements of components of computer device or a 120 which correspond to components of computer device 20 are numbered similarly or are shown in FIGS. 1-4.

Hinge foot 170 comprises a structure coupled to end portion 62 of leg 52 and end portion 178 of linkage 172. Hinge foot 170 pivotably couples leg 52 to the linkage 172. Hinge foot 170 further serves as a foot bearing against or contacting support surface 64 when leg 52 is in the extended position shown in FIGS. 6-7. In one implementation, surfaces of hinge foot 170 frictionally engage support surface 64 to resist sliding movement and inadvertent pivoting of leg 52 when leg 52 is propped against surface 64 in the extended position.

In the example shown, hinge foot 170 comprises a rubber, synthetic rubber, flexible polymer, synthetic leather or leather material secured to leg 52 and linkage 172 so as to form a living hinge having a relatively high coefficient of friction with respect to support surface 64 to resist such sliding movement. At the same time, because hinge foot 170 provided by a relatively thin panel or sheet of material which forms a living hinge, hinge foot 170 pivotally connects leg 52 and linkage 172 while not substantially increasing the thickness of computer device 120 when leg 52 and linkage 172 are in the retracted state shown in FIG. 8. In one implementation, hinge foot 170 may comprise a sleeve of rubber like material or leather which receives end portion 62 and end portion 178 of leg 52 and linkage 172, respectively. In other implementations, hinge foot 170 may be formed from other materials and may have other configurations.

Angle retaining linkage 172 comprises an elongated member extending from end portion 178 to engagement end 180. Engagement end 180 is located so as to engage, contact or abut linkage retainer 174 when leg 52 is in the extended position to maintain angular spacing of leg 52 from cavity 142 and the lower portion of back cover 38. Angle retaining linkage 172 is pivotably coupled to leg 52 so as to pivot between different angular positions relative to leg 52 to adjust an angle of inclination of computer device 120.

In one implementation, angle retaining linkage 172 comprises a bar or plate. In another implementation, angle retaining linkage 172 comprises a rod or other inflexible or rigid structure. In the example illustrated, angle retaining linkage 172 has a thickness such that when folded substantially parallel to leg 52 in the retracted position or state shown in FIG. 8, the combined thickness of angle retaining linkage 172 and leg 52 is less than or equal to a depth of cavity 142. Cavity 152 is substantially similar to cavity 42 of the cavity 142 has a depth greater than or equal to a combined thickness of angle retaining linkage 172 and leg 52.

Linkage retainer 174 comprises one or more structures on a floor or back surface of cavity 142 which are configured to grip and retain engaging end 180 of linkage 172 in place at one of a plurality of available vertical positions along back cover 38, corresponding to different angles of linkage 172. In the example illustrated, linkage retainer 174 comprises a series of detents or teeth vertically arranged along back cover 38 when computer device 120 is in an upright or inclined orientation. Each of the detents of retainer 174 provides a distinct vertical cavity which receives engaging end 180 to retain engaging end 180 in place. As shown by FIGS. 8-11, engaging end 180 is selectively positionable within each of the detents of retainer 174 and is retained in place to retain linkage 172 at a selected angle relative to leg 52 and to retain leg 52 at a selected angle with respect to back cover 38 so as to support computer device 120 at a desired angle, such as the vertical inclinations shown in FIG. 6 or the horizontal inclination shown in FIG. 7.

Although illustrated as a continuous series of detents or a continuous series of teeth, in other implementations, retainer 174 may comprise vertically spaced notches, apertures, grooves or detents along or within back cover 38 or along the floor back surface of channel 142. In yet other implementations, retainer 174 may have other configurations. For example, in other implementations, retainer 174 comprises a nonslip or other gripping surface having a large to coefficient of friction with engagement and 180 of linkage 172 so as to inhibit slipping of engagement end 180 along retainer 174. For example, in other implementations, retainer 174 comprises a pad or strip of material having a sand paper-like surface against which engagement end 180 contacts. In another implementation, retainer 174 may comprise a soft or flexible strip or panel of material, such as a soft rubber, cork or foam like material, wherein engagement end 180 is pointed or is otherwise configured to at least temporarily indent, pierce, resiliently compress or resiliently deform the strip or panel of material such that engagement end 180 of linkage 172 is retained in place. In one implementation, retainer 174 is integrally formed as part of a single unitary body with back cover 38. In another implementation, retainer 174 is formed from a separate patch, panel or other structure which is welded, bonded, fused, snapped into or otherwise joined to back cover 38.

Figures 6, 7, 8:
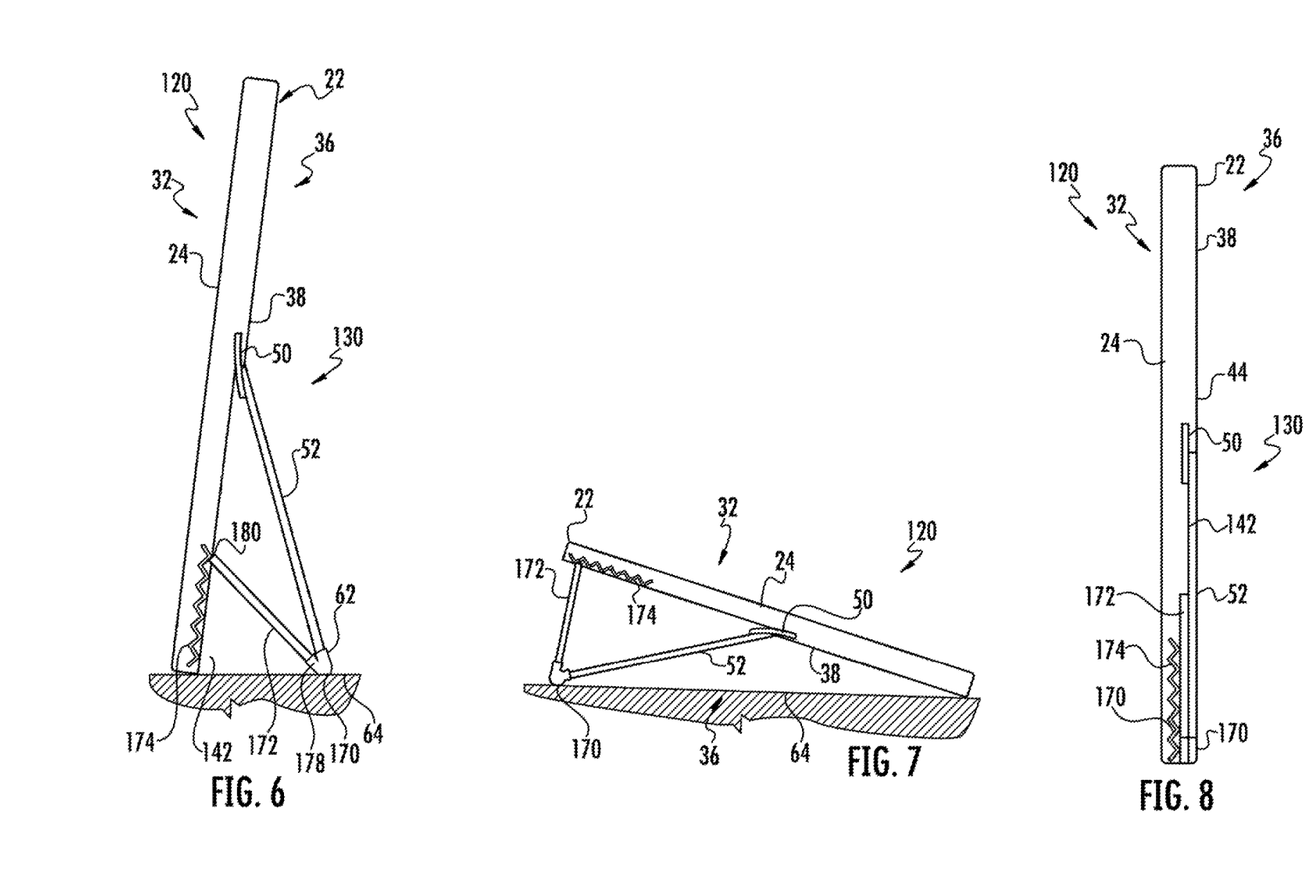
FIG. 6 is a side view of an example implementation of the computer device of FIG. 2 supported in a vertically inclined orientation with an example support mechanism in an extended position.
FIG. 7 is a side view of the computer device of FIG. 6 supported in a horizontally inclined orientation with the example support mechanism in the extended position.
FIG. 8 is a side view of the computer device of FIG. 6 with the example support mechanism in a retracted position.
Figure 9:
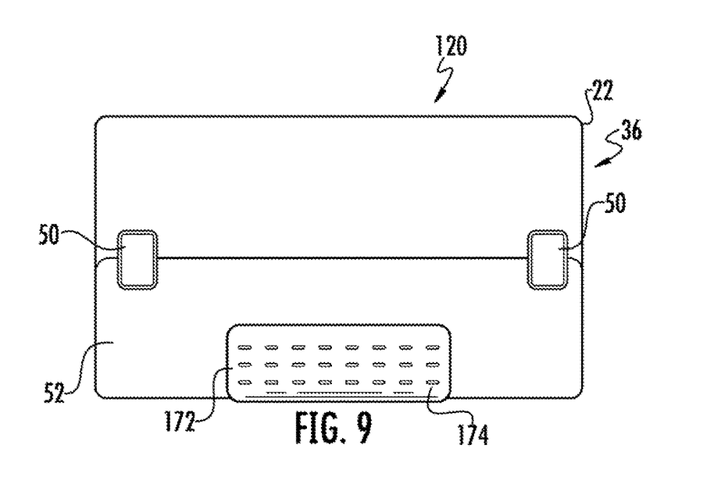
FIG. 9 is a rear view of the computer device of FIG. 8.

FIGS. 8 and 9 illustrate computer device 120 with leg 52 in the retracted state or position. As shown by FIG. 8, when in the retracted position, linkage 172 pivots to a position substantially parallel to leg 52 between leg 52 and back cover 38. Leg 52 pivots to a position substantially parallel to display panel or screen 24 and back cover 38. In the example illustrated, leg 52 is received within channel 142 such that back surface 44 of housing 22 is planar or flat, permitting display screen 24 to extend in a horizontal plane when computer device 120 is horizontally resting upon support surface 64. In other implementations, leg 52, when in the retracted state or position, is recessed within cavity 142 such that those surfaces of back cover 38 extending about cavity 42 support display screen 24 in a substantially horizontal plane facing upwards when computer device 120 is horizontally resting upon support surface 64.

As shown by FIG. 9, in the example illustrated, support mechanism 130 comprises a pair of horizontally spaced leaf springs 50. In the example illustrated, leg 52 extends substantially across or spans the entire dimension of computer device 120 while linkage 172 and retainer 174 are substantially centered and extend across a less than complete portion of the same dimension of computer device 120. In other implementations, support mechanism 130 may comprise a single leaf spring 50 or greater than the two leaf springs illustrated. In other implementations, linkage 172 and retainer 174 may extend along a greater extent or a lesser extent of the dimension of computer device 120 as illustrated in the example.

Figure 10:
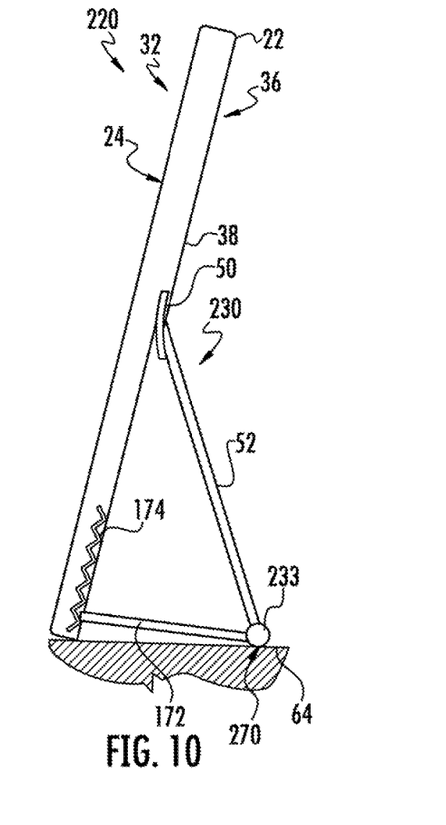
FIG. 10 is a side view of another implementation of the computer device of FIG. 2 with an example support mechanism in an extended position.
Figure 11:
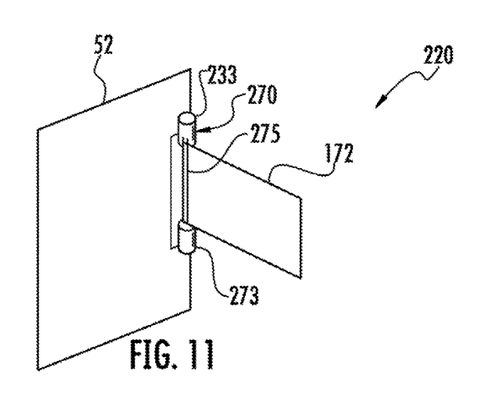
FIG. 11 is a rear perspective view of a portion of another example implementation of the computer device of FIG. 2 illustrating an example hinge foot pivotally joining a leg to an angle retaining linkage.

FIG. 10 illustrates computer device 220, another implementation of computer device 20. Computer device 220 is similar to computing device 120 except that computer device 220 comprises support mechanism 230. Support mechanism 230 is similar to support mechanism 130 except that support mechanism 230 comprises hinge foot 270 in place of hinge foot 170. Those remaining components are elements of computer device 220 support mechanism 230 which correspond to components of computer device 120 and support mechanism 130 are numbered similarly or are shown in FIGS. 2 and 8. Hinge foot 270 pivotally connects leg 52 to linkage 172. In contrast to a living hinge, hinge foot 270 comprises a hinge in which two or more members rotate about a fixed axis relative to one another. In one implementation, hinge foot 270 comprises a piano hinge. FIG. 11 is a perspective view illustrating hinge foot 270 pivotally connecting leg 52 to an example angle retaining linkage 172. In the example illustrated, hinge foot 270 comprises a pair of opposite mutually facing hubs 273 having internal bores which rotatably receive end portions of a shaft 275 that is connected to end portion 178 of linkage 172. In such an implementation, each of hubs 273 is formed from a rubber-like material or is coated with a rubber-like material so as to additionally serve as a feet which grip support service 64 (as shown in FIG. 10) to prevent slippage of leg 52 and computer device 220. In yet other implementations, hinge foot 278 comprise other types of mechanical hinges in which two members rotate about a fixed axis relative to one another.

Figure 12:
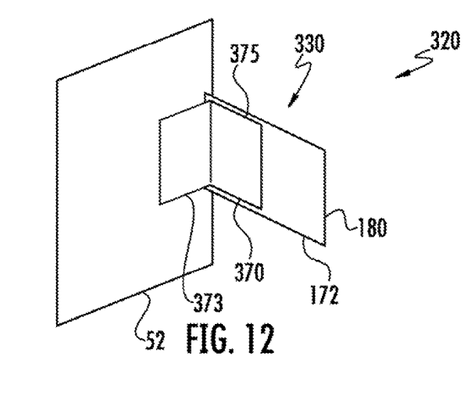
FIG. 12 is a rear perspective view of a portion of another example implementation of the computer device of FIG. 2 illustrating another example hinge foot pivotally joining a leg to an angle retaining linkage.

FIG. 12 illustrates computer device 320, another example implementation of computer device 20. Computer device 320 is similar to computer device 120 except that computer device 320 comprises support mechanism 330 in place of support mechanism 130. Support mechanism 330 is similar to support mechanism 130 except that support mechanism 330 comprises hinge foot 370 in place of hinge foot 170. Those remaining components of computer device 320 which correspond to components of computing device 120 are numbered similarly or are shown in FIG. 2 or 8. Computer device 320 comprises housing 22, display screen 24, processor 26 and memory 28 shown in FIG. 2. Computer device 320 comprises support mechanism 330 which comprises leaf springs 50 (shown in FIG. 9), leg 52, linkage 172 and hinge foot 370.

Hinge foot 370 comprises a panel of flexible or bendable material, such as a rubber material, flexible polymeric materiel or a leather/synthetic leather material or the like. As shown by FIG. 12, the panel of flexible material forming hinge foot 370 has a first portion 373 secured to leg 52 and a second portion 375 secured to linkage 172. As with hinge foot 170, hinge foot 370 forms a living hinge which pivotally supports linkage 172 relative to leg 52. In the example illustrated, the panel of flexible materiel extends along an underside of linkage 172 such that it contacts support surface 64 when leg 52 is in an extended state similar to that shown in FIG. 6, 7 or 10. In such an implementation, the surface of the panel forming hinge foot 370 assists in gripping support surface 64 to inhibit sliding motion of leg 52 relative to support surface 64. In other implementations, the panel forming foot hinge 370 extends along an upper surface of linkage 172. In such an implementation, lower surfaces of leg 52 at end 62 or lower surfaces of linkage 172 at end 178 are provided with a gripping surface such as by being provided with serrations, dimples or other high friction surface structures or such as being provided with or coated with a compressible layer of material such as a rubber or leather-like material.

Figure 13:
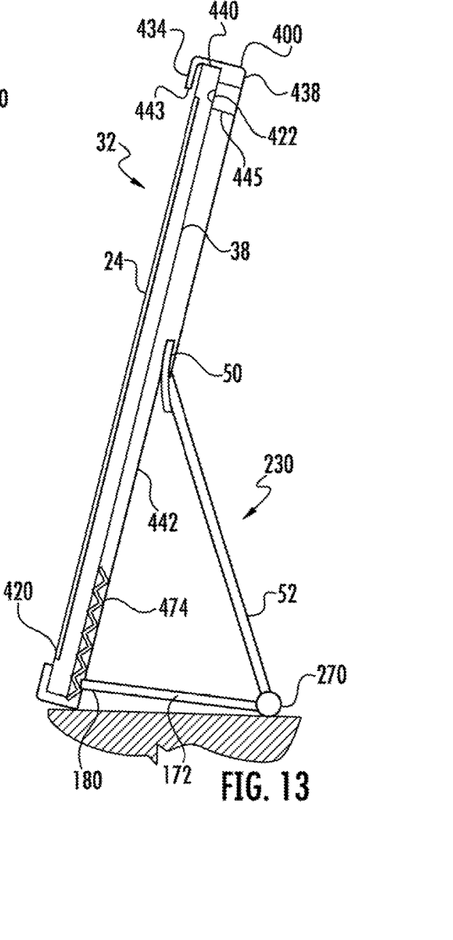
FIG. 13 is a side view of an example computer device case supporting a received computer device in a vertically inclined orientation with an example support mechanism in an extended position.

FIG. 13 illustrates computer device case 400 removably receiving a computer device 420. Computer device 420 is similar to computer device 20 except that computer device 20 omits support mechanism 30 and omits cavity 42 within back cover 38. Case 400 removably receives computer device 420 while providing support mechanism 230. In the example illustrated, computer device 420 comprises a camera window 422. As shown by FIG. 13, casing 400 comprises a front portion 434 and a back cover 438 which cooperate to form a cavity 440 which removably receives computer device 420. Front portion 434 wraps about computer device 420 so as to extend along a front side 32 of computer device 420 while framing display screen 24. Front portion 434 has an opening 443 to expose display screen 24.

Back cover 438 comprises an opening 445 corresponding in location to the location of camera window 422 of computer device 420 when computer device 420 is fully received within cavity 440. In the example illustrated, back cover 438 comprises a channel 442 and a linkage retainer 474 which are similar to channel 142 and linkage retainer 174 of that cover 38 of computer device 120, respectively. As with channel 142, channel 442 receives leg 52, linkage 172 and hinge foot 270 when leg 52 is in a retracted state. As with linkage retainer 174, linkage retainer 474 engages and retains an engaging end 180 of linkage 172 in place to maintain the selected angular positioning of linkage 172 and leg 52 to support case 400 and computer device 420 at a selected vertical or horizontal inclination.

Support mechanism 230 is similar to support mechanism 230 described above with respect to computer device 220 except that support mechanism 230 in FIG. 13 is employed with back cover 438 of case 400 which receives a separate computer device 420. As with support mechanism 130 of computer device 220 and support mechanism 130 of computer device 120, support mechanism 230 of case 400 supports computer device 420 in any one of a multitude of selectable inclined orientations without substantially increasing a thickness of case 400 or of the combined computer device 420 and case 400. In other implementations, case 400 may alternatively comprise other support mechanisms such as support mechanism 30, support mechanism 130 or support mechanism 330 described above, wherein such support mechanisms are supported and carried by back cover 438 of casing 400 rather than the back cover 38 of a computer device.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A computer device comprising:
   a back cover;
   a support stand leg;
   a foot coupled to an end of the support stand lea;
   a leaf spring having a first end portion embedded in the back cover and a second end portion coupled to the support stand leg, the leaf spring pivotally connecting the support stand leg to the back cover for movement between a retracted position against the back cover and an extended position, the leaf spring resiliently urging the support stand leg towards the retracted position;
   a linkage retainer extending along the back cover and having a vertically extending series of detents: and
   an angle retaining linkage pivotably coupled to and extending from the end of the support stand lea, wherein the angle retaining linkage comprises an end releasably positionable at a selected position along the linkage retainer within a selected one of the detents to retain an angle of the support stand leg relative to the back cover.

2. The computer device of claim 1, wherein the back cover comprises a recess completely receiving the support stand leg, the leaf spring and the angle retaining linkage when the support stand leg is in the retracted state.

3. The computer device of claim 1, further comprising a piano hinge pivotally connecting the support stand leg to the angle retaining linkage.

4. The computer device of claim of 1, further comprising a flexible living hinge pivotally connecting the support stand leg and the angle retaining linkage.

5. The computer device of claim 4, wherein the living hinge forms a foot to frictionally grip an underlying support surface when the support stand leg is in the extended position.

6. The computer device of claim 1, wherein the back cover comprises a recess completely receiving the support stand leg and the leaf spring when the support stand leg is in the retracted position.

7. A computer device case and stand comprising:
   a back cover;
   a front frame coupled to the back cover to form a cavity to removably receive a computer device with a display of the computer device exposed through the front frame;
   a support stand leg;
   a leaf spring having a first end portion embedded in the back cover and a second end portion coupled to the support stand leg, the leaf spring pivotally connecting the support stand leg to the back cover for movement between a retracted position against the back cover and an extended position, the leaf spring resiliently urging the support stand leg towards the retracted position;
   a series of detents vertically extending along the back cover; and an angle retaining linkage pivotably coupled to and extending from an end of the support stand lea, wherein the angle retaining linkage comprises an end positioned in a selected one of the detents to retain and angle of the support stand leg relative to the back cover.

8. The computer device case and stand claim 7, wherein the back cover comprises a recess completely receiving the support stand leg, the leaf spring and the angle retaining linkage when the support stand leg is in the retracted state.

9. A method comprising:
pivotably supporting a support stand leg relative to the back cover of a computer device with a spring steel leaf spring, wherein the leaf spring has a first end portion embedded in the back cover and a second end portion coupled to the support stand leg;
resiliently urging the support stand leg from an extended position towards a retracted position against the back cover with the spring steel leaf spring; and extending an angle retaining linkage from an end of the support stand leg into engagement with a selected one of a plurality of vertically spaced detents.

10. The method of claim 9, further comprising recessing the support stand leg, the spring steel leaf spring and the angle retaining linkage within the back cover when the support stand leg is in the retracted position.

\* \* \* \* \*

UNITED STATES PATENT AND TRADEMARK OFFICE
CERTIFICATE OF CORRECTION

PATENT NO. : 9,958,906 B2  
APPLICATION NO. : 15/305291  
DATED : May 1, 2018  
INVENTOR(S) : Chi-Chung Ho Page 1 of 1

It is certified that error appears in the above-identified patent and that said Letters Patent is hereby corrected as shown below:

In the Claims

In Column 8, Line 15, in Claim 1, delete "lea;" and insert -- leg; --, therefor.

In Column 8, Line 26, in Claim 1, delete "lea," and insert -- leg, --, therefor.

In Column 8, Line 66, in Claim 7, delete "lea," and insert -- leg, --, therefor.

In Column 9, Line 1, in Claim 7, delete "and" and insert -- an --, therefor.

Signed and Sealed this  
Fourth Day of September, 2018

Andrei Iancu  
*Director of the United States Patent and Trademark Office*